United States Patent
Enke et al.

(10) Patent No.: US 11,665,422 B2
(45) Date of Patent: *May 30, 2023

(54) METHOD AND SYSTEM FOR USER FEEDBACK IN A MOTION CONSTRAINED IMAGE STABILIZATION SYSTEM

(71) Applicant: GoPro, Inc., San Mateo, CA (US)

(72) Inventors: Joseph A. Enke, Campbell, CA (US); Kielan C. Crow, San Mateo, CA (US); Pascal Gohl, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,416

(22) Filed: Aug. 3, 2021

(65) Prior Publication Data

US 2022/0046168 A1    Feb. 10, 2022

Related U.S. Application Data

(63) Continuation of application No. 16/718,301, filed on Dec. 18, 2019, now Pat. No. 11,089,208, which is a
(Continued)

(51) Int. Cl.
*G03B 17/56* (2021.01)
*H04N 23/60* (2023.01)
*F16M 11/12* (2006.01)
(Continued)

(52) U.S. Cl.
CPC ............ *H04N 23/64* (2023.01); *F16M 11/12* (2013.01); *G03B 17/56* (2013.01); *G08B 21/182* (2013.01);
(Continued)

(58) Field of Classification Search
CPC .......... H04N 5/23222; H04N 5/23245; H04N 5/2328; F16M 11/12; F16M 11/123;
(Continued)

(56) References Cited

U.S. PATENT DOCUMENTS 10,536,630 B2   1/2020   Enke
11,089,208 B2   8/2021   Enke
(Continued)

OTHER PUBLICATIONS

International Preliminary Report on Patentability and Written Opinion for App. No. PCT/US2019/012141, dated Jul. 16, 2020, 6 pages.
(Continued)

*Primary Examiner* — Yogesh K Aggarwal
(74) *Attorney, Agent, or Firm* — Young Basile Hanlon & MacFarlane, P.C.

(57) ABSTRACT

The disclosure describes systems and methods for a stabilization mechanism. The stabilization mechanism may be used in conjunction with an imaging device. The method may be performed by a control system of the stabilization mechanism and includes obtaining a device setting from an imaging device. The method may also include obtaining a configuration of the stabilization mechanism. The method includes determining a soft stop based on the device setting, the configuration, or both. The soft stop may be a virtual hard stop that indicates to the stabilization mechanism to reduce speed as a field of view of the imaging device approaches the soft stop. The method may also include setting an image stabilization mechanism parameter based on the determined soft stop.

20 Claims, 9 Drawing Sheets

Related U.S. Application Data continuation of application No. 15/906,726, filed on Feb. 27, 2018, now Pat. No. 10,536,630.

(60) Provisional application No. 62/614,146, filed on Jan. 5, 2018.

(51) Int. Cl.
*H04N 23/667* (2023.01)
*H04N 23/68* (2023.01)
*G08B 21/18* (2006.01)

(52) U.S. Cl.
CPC ......... *H04N 23/667* (2023.01); *H04N 23/685* (2023.01)

(58) Field of Classification Search
CPC ........ F16M 11/18; F16M 13/00; G03B 17/56; G03B 17/561; G08B 21/182; G08B 13/1963; G08B 13/19632
See application file for complete search history.

(56) References Cited

U.S. PATENT DOCUMENTS

| | | |
|---|---|---|
| 2010/0102173 A1 | 4/2010 | Everett |
| 2014/0270743 A1 | 9/2014 | Webb |
| 2014/0288694 A1 | 9/2014 | Wagner |
| 2016/0091729 A1 | 3/2016 | Ollila |
| 2017/0163899 A1* | 6/2017 | Irie .................. H04N 5/23218 |
| 2017/0255824 A1 | 9/2017 | Miller |
| 2018/0371723 A1 | 12/2018 | Nishi |
| 2019/0215451 A1 | 7/2019 | Enke |
| 2020/0145577 A1 | 5/2020 | Enke |

OTHER PUBLICATIONS

International Search Report and Written Opinion for Appl. No. PCT/US2019/012141, dated Apr. 4, 2019, 8 pages.

* cited by examiner

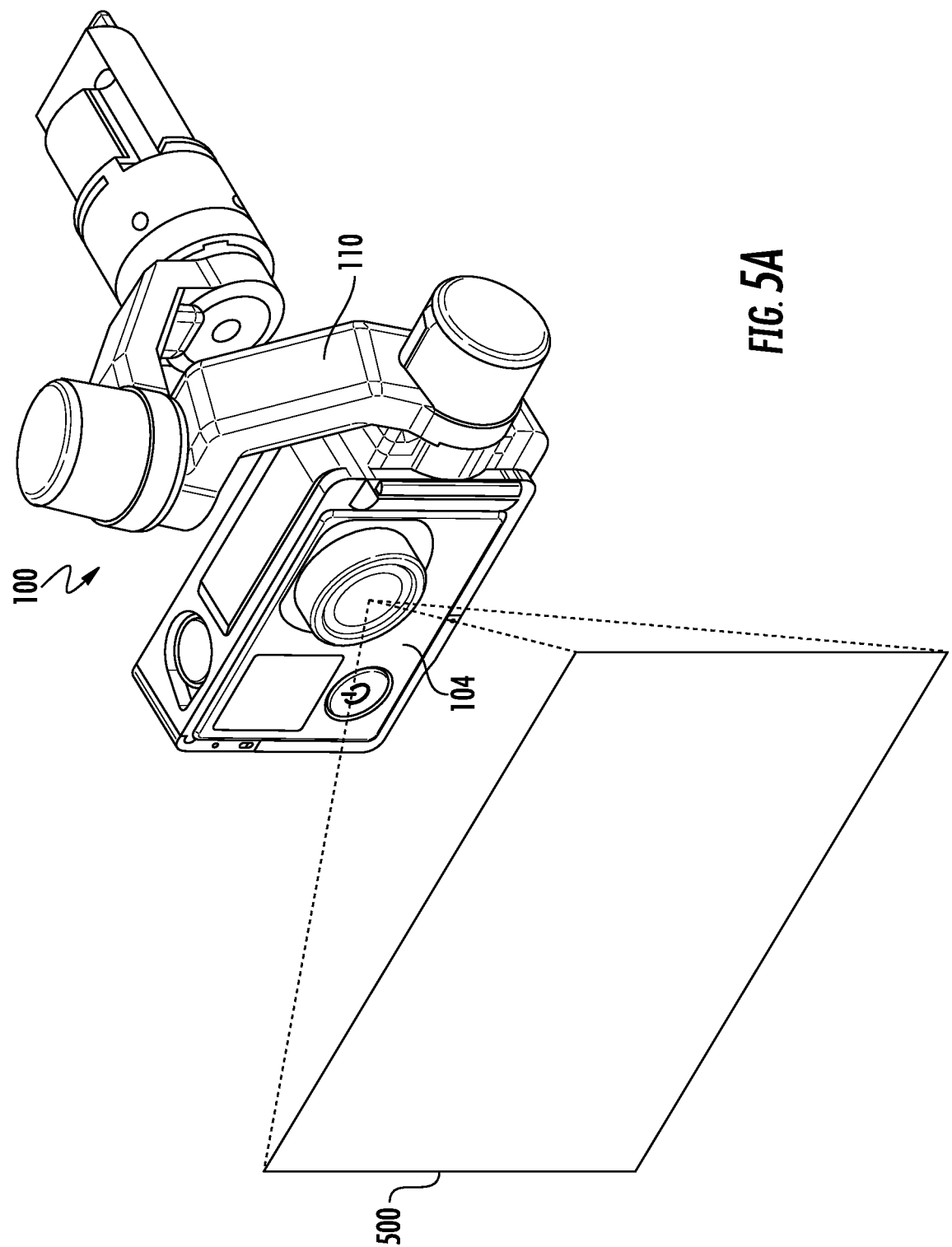

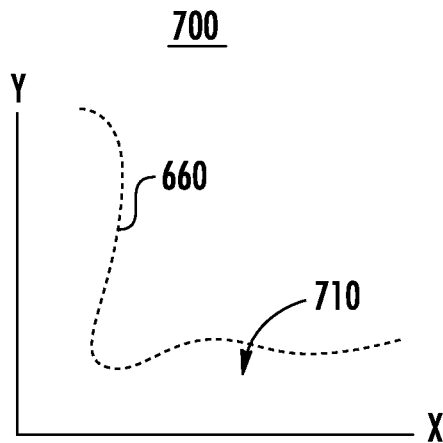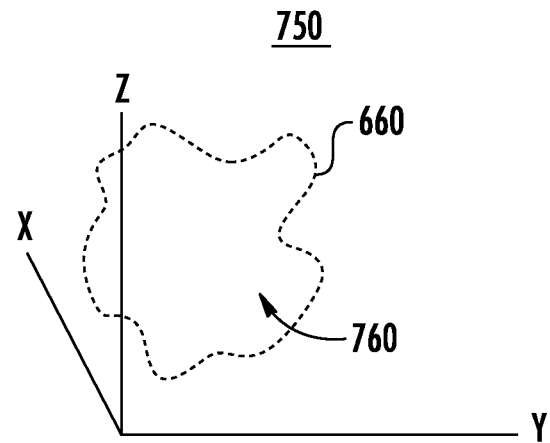
FIG. 7A  FIG. 7B
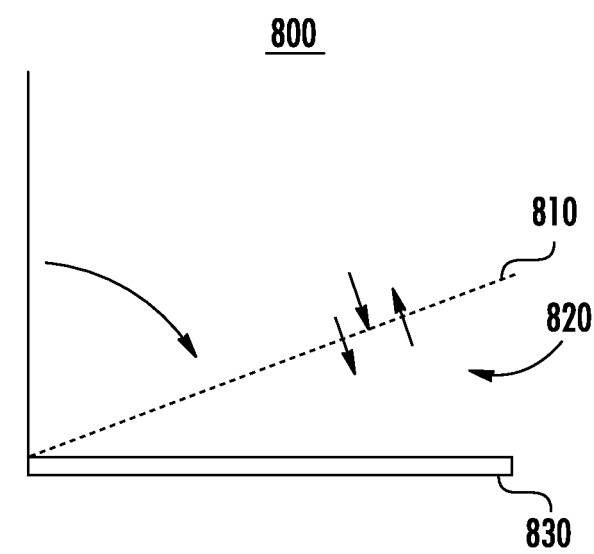
FIG. 8

METHOD AND SYSTEM FOR USER FEEDBACK IN A MOTION CONSTRAINED IMAGE STABILIZATION SYSTEM

CROSS REFERENCE TO RELATED APPLICATIONS

This application is a continuation of U.S. application Ser. No. 16/718,301, filed Dec. 18, 2019, which is a continuation of U.S. application Ser. No. 15/906,726, filed Feb. 27, 2018, now U.S. Pat. No. 10,536,630, which claims the benefit of U.S. Provisional Application No. 62/5614,146, filed Jan. 5, 2018, the contents of which are incorporated by reference herein in their entirety.

TECHNICAL FIELD

The present disclosure relates generally to image stabilization mechanisms, for example, gimbals, and more specifically to dynamic soft stop generation and feedback mechanisms.

BACKGROUND

Stabilized imaging systems are either over-constrained or they are under-constrained. When stabilized imaging systems are over-constrained, they cannot capture the system itself, which limits stabilization performance and limits range of motion. When stabilized imaging systems are under-constrained, undesirable footage is captured when the system captures itself. It is not clear to the user when a stabilized imaging device is pointing where intended or is getting close to a hard stop of an undesirable or desirable position within its range of motion. Furthermore, some imaging systems may not include effective stabilization features for gimbals. For example, vibrations, jitter, noise, or other interference resulting from the motor of an unmanned air vehicle (UAV) operating can travel to and affect the stability of a gimbal.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for use in a stabilization mechanism. The stabilization mechanism may be used in conjunction with an imaging device. The method may be performed by a control system of the stabilization mechanism and may include obtaining a device setting from an imaging device and/or obtaining a configuration of the stabilization mechanism. The method may also include determining a soft stop based on the device setting and/or the configuration. The soft stop may be a virtual hard stop that indicates to the stabilization mechanism to reduce speed as a field of view of the imaging device approaches the soft stop. The method may also include setting an image stabilization mechanism parameter based on the determined soft stop. Other embodiments of this aspect include corresponding computer systems, apparatus, and computer programs recorded on one or more computer storage devices, each configured to perform the actions of the methods.

Implementations may include one or more of the following features. The method where the device setting includes at least one of an image resolution, an image mode, or a field of view of the imaging device. The method where the configuration includes whether the stabilization mechanism is a handheld or mounted stabilization mechanism, whether the stabilization mechanism is an aerial configuration, whether a specific aerial device is used, whether a specific mount is used, whether a specific handheld device is used, or whether a specific activity is performed. The method may further include transmitting a signal, such as a bump signal, to alert a user that the soft stop is approaching. The bump signal may be at least one of an audible alert, a luminous alert (i.e., light indicator), a text alert, or a haptic alert. The method may further include transmitting a signal, such as a bump signal, to alert a user that the soft stop is reached. The bump signal may be at least one of an audible alert, a luminous alert, a text alert, or a haptic alert. Implementations of the described techniques may include hardware, a method or process, or computer software on a computer-accessible medium.

One general aspect includes a stabilization mechanism that includes at least one motor and a control system. The stabilization mechanism may be associated with an imaging device. The control system may be configured to receive an input, set a soft stop based on the input, and receive a command to move the stabilization mechanism towards a hard stop. The control system may be further configured to determine whether a soft stop is approaching and transmit a command to the at least motor to reduce motor speed on a condition that the control system determines that the soft stop is approaching. If the soft stop is reached, the control system may transmit a command to the motor to stop the motor. Other embodiments of this aspect include corresponding computer systems, apparatus, and computer programs recorded on one or more computer storage devices, each configured to perform the actions of the methods.

Implementations may include one or more of the following features. The stabilization mechanism may include a control system that is further configured to set a bump region to alert a user. The bump region may be based on the input. The control system of the stabilization mechanism may be further configured to transmit a signal to alert a user that the soft stop is approaching. The signal may be a bump signal and may be at least one of an audible alert, a luminous alert, a text alert, or a haptic alert. The control system may be further configured to transmit another signal to alert a user that the soft stop is reached. This signal may be at least one of an audible alert, a luminous alert, a text alert, or a haptic alert. The input may be at least one of a device setting, a configuration, data associated with an image, or a user input. The device setting may be associated with the imaging device and may include at least one of an image resolution, an image mode, or a field of view of the imaging device. The image mode may be a portrait mode or a landscape mode. The configuration may be associated with a configuration of the stabilization mechanism and may include whether the stabilization mechanism is a handheld or mounted stabilization mechanism, whether the stabilization mechanism is an aerial configuration, whether a specific aerial device is used, whether a specific mount is used, whether a specific handheld device is used, or whether a specific activity is performed. The data associated with the image may be used to determine an obstruction in a field of view of the imaging device. The user input may include a user drawing, a user voice command, or a user text input. Implementations of the described techniques may include hardware, a method or process, or computer software on a computer-accessible medium.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed embodiments have other advantages and features that will be more readily apparent from the detailed description, the appended claims, and the accompanying figures. A brief introduction of the figures is below.

FIG. 5A is a diagram of an example of an unobstructed field of view for an imaging device.

FIG. 7A is a diagram of an example of a plot of the dynamic soft stop region in two dimensions.

FIG. 7B is a diagram of an example of a plot of the dynamic soft stop region in three dimensions.

FIG. 8 is a diagram of an example of a scenario where a dynamic soft stop is used to define a keep out are that allows a maximum range of motion for a stabilizer.

DETAILED DESCRIPTION

Stabilization mechanisms have a physical limitation with respect to the range of motion in any one of three axes. This physical limitation is referred to as a hard stop. During image capture, reaching a hard stop will create an undesirable image capture due to the sudden stop of the imaging device. This disclosure describes improved stabilization techniques that provide the user notice of an approaching hard stop.

The embodiments disclosed herein will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1A:
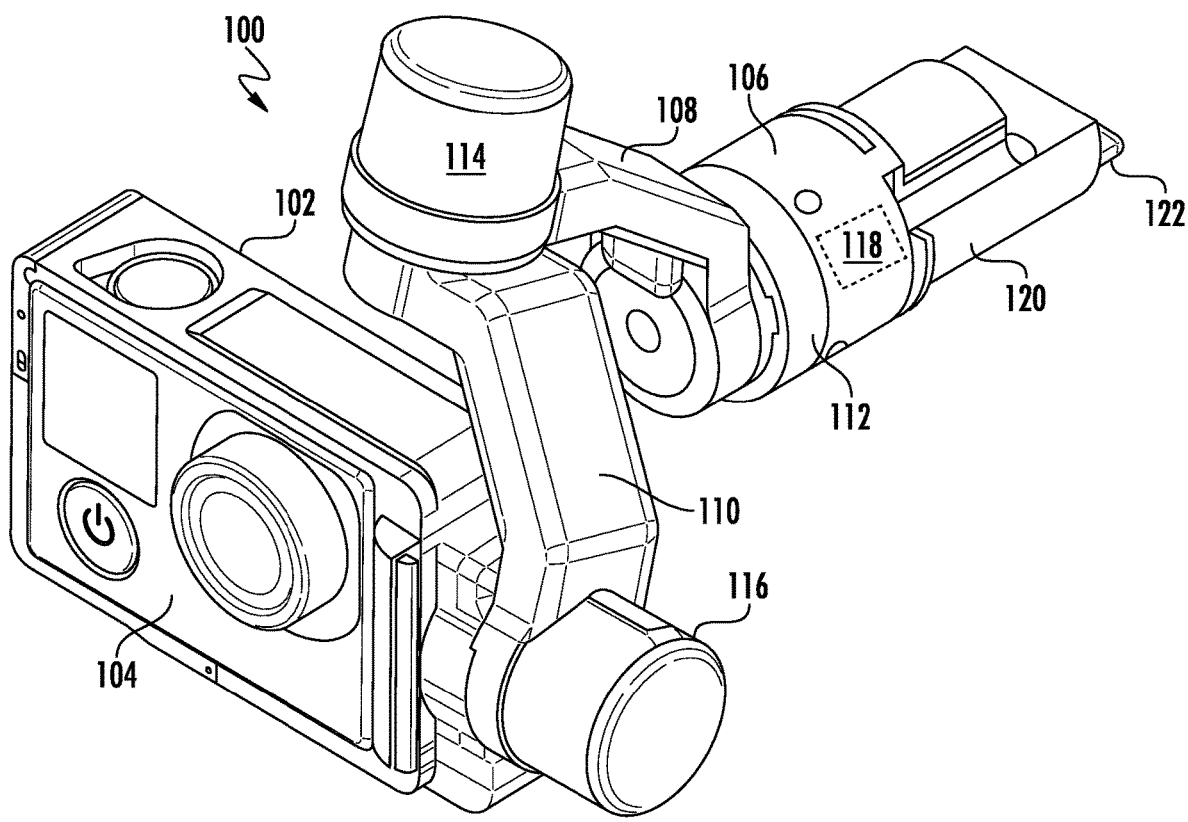
FIG. 1A shows an example of a three-axis image stabilization mechanism.

FIG. 1A shows an example of a three-axis image stabilization mechanism. In this example, the three-axis stabilization mechanism is a gimbal 100. A frame 102 that secures an imaging device 104 is removably coupled to the gimbal 100. The gimbal 100 includes three arms, a first arm 106, a second arm 108, and a third arm 110. The gimbal 100 also includes three motors, a first motor 112, a second motor 114, and a third motor 116, each associated with one or more of the arms 106, 108, 110, for example, at junctures between the arms 106, 108, 110. Each of the motors 112, 114, 116 may include one or more encoders (not shown) that detect axial rotation.

In the example of FIG. 1A, the first motor 112 is integral with the first arm 106. A first end of the second arm 108 is connected to the first arm 106 and the first motor 112. A second end of the second arm 108 is connected to the second motor 114 and a first end of the third arm 110. A second end of the third arm 110 is connected to the third motor 116 and the removable frame 102 securing the imaging device 104. The sequential connections of arms 106, 108, 110 and motors 112, 114, 116 allows for three-axis rotation and control of a mounted object, such as the imaging device 104, in space.

The gimbal 100 operates to maintain the imaging device 104 in a specified orientation. When the gimbal 100 and the imaging device 104 are attached to a platform (e.g., a UAV, a handheld grip, or another platform) that moves in space, the imaging device 104 remains generally motionless in respect to the platform. The gimbal 100 may include a control system 118, either on-board or remote, that provides commands to the motors 112, 114, 116 to maintain the specified orientation of the imaging device 104 based, for example, on information received from sensors (not shown) that indicate instantaneous values for or changes in orientation of the imaging device 104 in respect to each of three axes of rotation (e.g., pitch, roll, and yaw). The specified orientation for the imaging device 104 may be based on: user-provided inputs or settings; sensor-provided information; a presence of a horizon, a tracked object, or other features detected in an image captured by the imaging device 104; an orientation of the gimbal 100 in respect to the platform; or any combination or extension of the preceding elements.

Each of the motors 112, 114, 116 may control orientation of the imaging device 104 about a single axis (e.g., pitch, roll, or yaw), for example, when orientation of the rotational axes of the motors 112, 114, 116 is orthogonal. The axis controlled by each of the motors 112, 114, 116 may depend on the type of platform to which the gimbal 100 is attached. For example, when the gimbal 100 is attached to a UAV, the first motor 112 may rotate the imaging device 104 about a roll axis, the second motor 114 may rotate the imaging device 104 about a yaw axis, and the third motor 116 may rotate the imaging device 104 about a pitch axis. In another example, when the gimbal 100 is attached to a handheld grip, the first motor 112 may rotate the imaging device 104 about a yaw axis, the second motor 114 may rotate the imaging device 104 about a roll axis, and the third motor 116 may rotate the imaging device 104 about a pitch axis.

Some of the motors 112, 114, 116 may control orientation of the imaging device 104 about more than one of the axes (e.g., pitch, roll, and yaw), for example, when orientation of some of the rotational axes of the motors 112, 114, 116 are not orthogonal. In the gimbal 100 shown in FIG. 1A, the first motor 112 and the third motor 116 have axes of rotation that are orthogonal, and the second motor 114 and the third motor 116 have axes of rotation that are orthogonal, but the first motor 112 and second motor 114 have axes of rotation that are not orthogonal. In this example, the first motor 112 may adjust only roll, and the third motor 116 may adjust only pitch, but the second motor 114 may adjust yaw primarily, but also pitch and roll secondarily. This configuration of the gimbal 100, where some of the motors 112, 114, 116 control orientation of the imaging device 104 about more than one of the axes, can allow for a larger field of view for the imaging device 104 while reducing obstructions in the field of view.

The gimbal 100 may include an attachment arm 120 coupled to the first arm 106, the first motor 112, or both, that allows the gimbal 100 to be mounted to a platform (e.g., a UAV, a handheld grip, or any other platform). The attachment arm 120 may be selectively removable. In other examples (not shown), the attachment arm 120 may be coupled to the second arm 108, the third arm 110, the second motor 114, the third motor 116, or any combination thereof. The attachment arm 120 can include a portion of a locking mechanism (not shown) to securely attach the gimbal 100 to a complementary portion of the locking mechanism (not shown) disposed on a platform (e.g., a UAV, a handheld grip, or any other platform). The locking mechanism may include male and female components, frictional components, clamping components, or any other suitable components to achieve locked coupling of the gimbal 100 and the platform.

The gimbal 100 and/or the attachment arm 120 may include a connector 122 for the gimbal 100 to electronically couple to one or more platforms (e.g., a UAV, a handheld grip, or any other platform). The connector 122 may provide power to the gimbal 100 and/or the imaging device 104 mounted in the frame 102. The connector 122 may enable communication between the control system 118 associated with the gimbal 100 and various sensors and/or controllers (not shown) associated with the platform to which the gimbal 100 is mounted.

Though FIG. 1A shows one size and shape for the frame 102 and the imaging device 104, the gimbal 100 may be designed to work with a variety of frame and imaging device combinations. The control system 118 may use different algorithms or control parameters to control the motors 112, 114, 116 based on a mass, center of gravity, and/or moment of inertia for a particular frame and imaging device combination coupled to the gimbal 100. For example, control parameters can include allowed minimums, maximums, and/or ranges for acceleration, velocity, torque, and/or voltage for the motors 112, 114, 116 given identification of the coupled imaging device and frame.

Figure 1B:
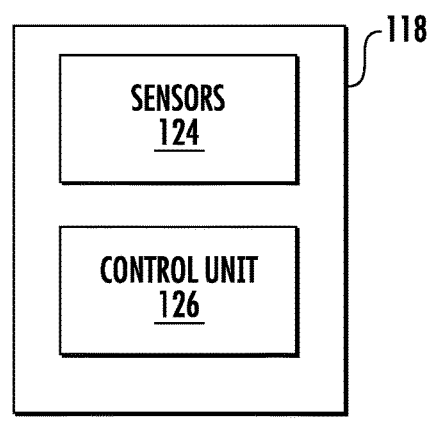
FIG. 1B shows a control system for the three-axis image stabilization mechanism of FIG. 1A.

FIG. 1B shows the control system 118 for the gimbal 100 of FIG. 1A. The control system 118 for the gimbal 100 includes one or more sensors 124 and a control unit 126. The sensors 124 may include: accelerometers, gyroscopes, and magnetometers within an inertial measurement unit (IMU) that determine rotation, orientation, and acceleration; rotary encoders that detect angular position of the motors 112, 114, 116; and a separate magnetometer to detect magnetic fields applied to the gimbal 100. Though a manufacturer may calibrate these sensors 124 upon production, inclusion of the sensors 124 in various packaging configurations and at various locations within a manufactured product such as the gimbal 100 may require additional and/or occasional calibration to account for stresses, both mechanical and thermal, that occur during manufacture, operation, and/or storage of the gimbal 100.

The control unit 126 may receive information from the various sensors 124 indicative of instantaneous orientation, angular velocity, and acceleration of various portions of the gimbal 100, such as each of the arms 106, 108, 110. The control unit 126 may use this information to apply a control algorithm that dictates angular rotation for the motors 112, 114, 116 to achieve a desired orientation for the imaging device 104 in respect to at least one of three rotational axis (e.g., pitch, roll, and yaw). The control algorithm can also account for a variety of imaging device and frame combinations of varying masses and moments of inertia. Based on the control algorithm, the control unit 126 may send commands to the motors 112, 114, 116 of the gimbal 100 to adjust the orientation of the imaging device 104.

Figure 2A:
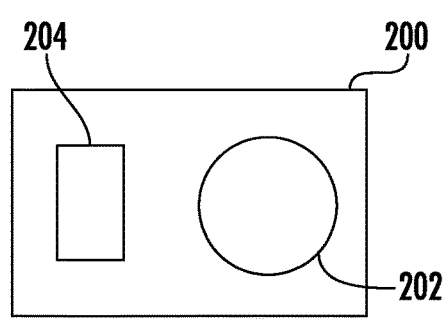
FIG. 2A shows an example of an imaging device for use with the image stabilization mechanism of FIG. 1A.

FIG. 2A shows an example of an imaging device 200 for use with the gimbal 100 of FIG. 1A. The imaging device 200 may be a camera, however, any type of imaging device that can be coupled to the gimbal 100 may be utilized. The imaging device 200 may be of the same type or a different type than the imaging device 104 of FIG. 1A. The imaging device 200 may include still image and video capture capabilities. The imaging device 200 may include a lens 202, a display screen 204, and a control unit (not shown). Means for coupling the imaging device 200 to the frame 102 for use with the gimbal 100 of FIG. 1A are not shown.

Figure 2B:
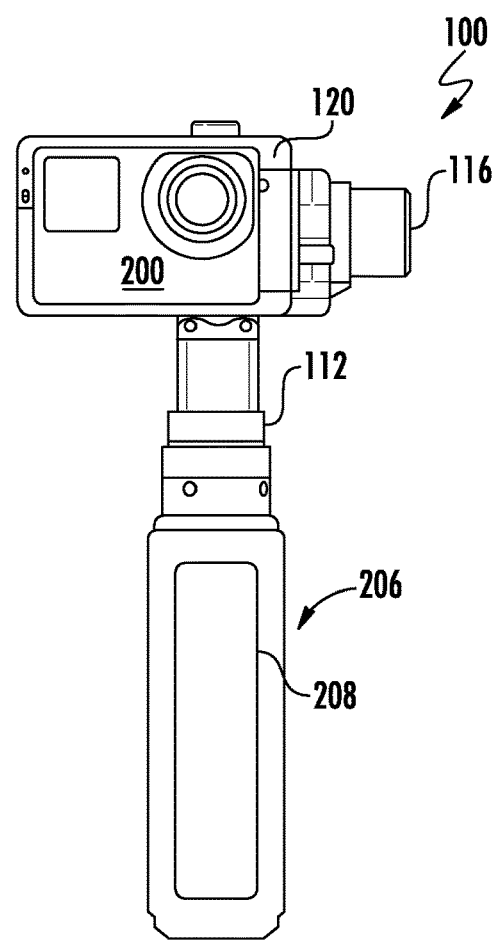
FIG. 2B shows an example of a handheld grip for use with the image stabilization mechanism of FIG. 1A and the imaging device of FIG. 2A.

FIG. 2B shows an example of a handheld grip 206 for use with the gimbal 100 of FIG. 1A and the imaging device 200 of FIG. 2A. The handheld grip 206 is one example of a platform that may support the gimbal 100 mechanically as well as communicate with the gimbal 100 electronically. The handheld grip 206 may include a user interface 208 that receive inputs from a user to control the gimbal 100, the imaging device 200, and/or the handheld grip 206. The handheld grip 206 may include a battery (not shown) or other power source to power the gimbal 100, the imaging device 200, and/or the handheld grip 206.

The handheld grip 206 may include a control unit (not shown) and/or storage capabilities such that image content from the imaging device 200 may be processed or stored within the handheld grip 206. The handheld grip 206 may include a port (not shown) to connect to another device, such as a mobile device or smart phone, that allows communication of image content or other information to/from the imaging device 200 and/or the handheld grip 206. The user interface 208 on the handheld grip 206 may also include a display or other visual indicator indicative of a mode of operation associated with the coupled gimbal 100 and/or the coupled imaging device 200.

Figure 2C:
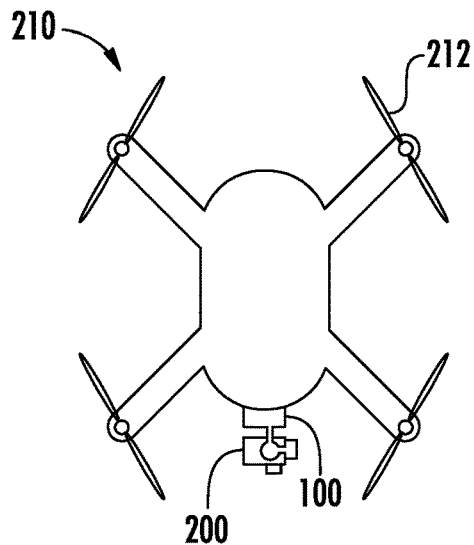
FIG. 2C shows an example of a UAV for use with the image stabilization mechanism of FIG. 1A and the imaging device of FIG. 2A.

FIG. 2C shows an example of a UAV 210 for use with the gimbal 100 of FIG. 1A and the imaging device 200 of FIG. 2A. In this embodiment, the UAV 210 has a quad-copter configuration, that is, the UAV 210 includes four rotors 212. Each rotor 212 is driven by a separate electric motor (not shown). However, the UAV 210 may be any form of an aerial vehicle. A battery pack (not shown) mounted on or in a body of the UAV 210 may supply electrical power to all four electric motors, flight electronics (not shown) associated with operation of UAV 210, and the imaging device 200 of FIG. 2A to provide still and video images by means of a communication link (not shown) to a ground-based user. The imaging device 200 may be coupled to a front of the UAV 210 using the gimbal 100 of FIG. 1A.

Figure 2D:
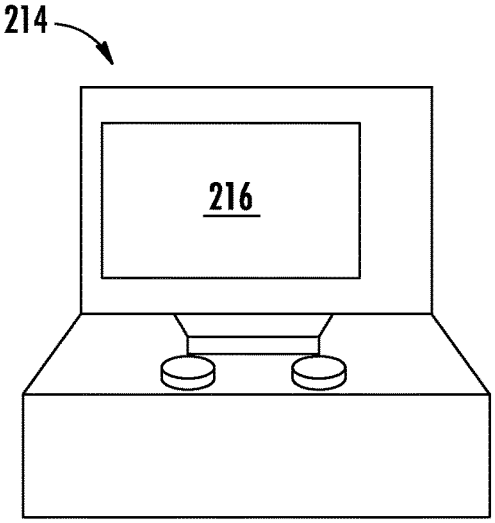
FIG. 2D shows an example of a remote controller for the UAV of FIG. 2C.

FIG. 2D shows an example of a remote controller 214 for the UAV 210 of FIG. 2C. The remote controller 214 includes a user interface 216 for operating the UAV 210. The remote controller 214 may include a communications interface (not shown) via which the remote controller 214 may receive and send commands related to operation of the gimbal 100, the imaging device 200, the handheld grip 206, and/or the UAV 210. The commands can include movement commands, configuration commands, operational control commands, calibration commands, and imaging commands. In some implementations, the remote controller 214 may be a smartphone, a tablet computer, a phablet, a smart watch, a portable computer, and/or another device configured to receive user inputs and communicate information with the gimbal 100, imaging device 200, the handheld grip 206, and/or the UAV 210.

For example, flight direction, attitude, and altitude of the UAV 210 may all be controlled by controlling speeds of the motors that drive the respective rotors 212 of the UAV 210. During flight, a GPS receiver on the UAV 210 may provide navigational data to the remote controller 214 for use in determining flight paths and displaying current location through the user interface 216. A vision-based navigation system may also be implemented that tracks visually significant features through image data captured by the imaging device 200 to provide the necessary speed and position of the UAV 210 to the remote controller 214.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 214 may operate a software application configured to perform a variety of operations related to camera configuration, positioning and/or calibration of the gimbal 100, control of video acquisition, and/or display of video captured by the imaging device 200 through the user interface 216. An application may enable a user to create short video clips and share video clips to a cloud service (e.g., Instagram®, Facebook®, YouTube®, Dropbox®); perform full remote control of functions of the imaging device 200; live preview video being captured for shot framing; mark key moments while recording for location and/or playback of video highlights; wirelessly control camera software; and/or perform other functions. Various methodologies may be utilized for configuring the imaging device 200 and/or displaying the captured information.

Figure 3:
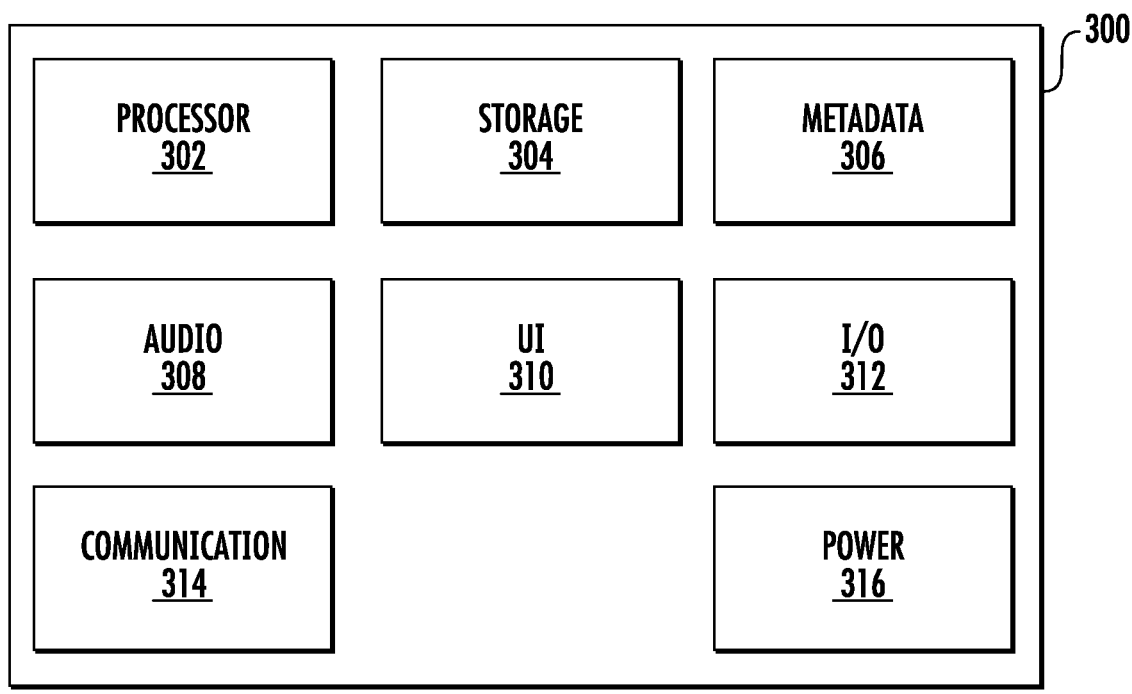
FIG. 3 is a block diagram illustrating components of a computing device.

FIG. 3 is a block diagram illustrating components of a computing device 300. The computing device 300 may be a single component of the gimbal 100, the imaging device 200, the handheld grip 206, the UAV 210, or the remote controller 214. The computing device 300 may be multiple computing devices distributed in various ways between the gimbal 100, the imaging device 200, the handheld grip 206, the UAV 210, or the remote controller 214. In the examples described, the computing device 300 may provide communication and control functions to the various components described in reference to FIGS. 2A, 2B, 2C, and 2D.

The computing device 300 may include a processor 302. The processor 302 may include a system on a chip (SOC), microcontroller, microprocessor, CPU, DSP, ASIC, GPU, or other processors that control the operation and functionality of the gimbal 100, the imaging device 200, the handheld grip 206, the UAV 210, and/or the remote controller 214. The processor 302 may interface with mechanical, electrical, sensory, and power modules via driver interfaces and software abstraction layers. Additional processing and memory capacity may be used to support these processes. These components may be fully controlled by the processor 302. In some implementations, one or more components may be operable by one or more other control processes (e.g., a GPS receiver may include a processing apparatus configured to provide position and motion information to the processor 302 in accordance with a given schedule (e.g., values of latitude, longitude, and elevation at 10 Hz.))

The computing device 300 may also include electronic storage 304 in which configuration parameters, image data, and/or code for functional algorithms may be stored. The electronic storage 304 may include a system memory module that is configured to store executable computer instructions that, when executed by the processor 302, control various functions of the gimbal 100, the imaging device 200, the handheld grip 206, the UAV 210, and/or the remote controller 214. The electronic storage 304 may also include storage memory configured to store content (e.g., metadata, frames, video, and audio) captured by the imaging device 200 or sensors associated with the gimbal 100, the imaging device 200, the handheld grip 206, the UAV 210, and/or the remote controller 214.

The electronic storage 304 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 304 may be available for other hardware, firmware, or software needs of the gimbal 100, the imaging device 200, the handheld grip 206, the UAV 210, and/or the remote controller 214. The memory and processing capacity may aid in management of processing configuration (e.g., loading, replacement) operations during a startup and/or other operations.

The computing device 300 may include or be in communication with metadata sources 306. The metadata sources 306 may include sensors associated with the gimbal 100, the imaging device 200, the handheld grip 206, the UAV 210, and/or the remote controller 214. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 200 may also provide metadata sources 306, e.g., image sensors, a battery monitor, storage parameters, and other information related to camera operation and capture of content. The metadata sources 306 may obtain information related to an environment of the handheld grip 206 and/or the UAV 210 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 306 may be rigidly coupled to the gimbal 100, the imaging device 200, the handheld grip 206, the UAV 210, and/or the remote controller 214 such that the processor 302 may be operable to synchronize various types of information received from various types of metadata sources 306.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 302 may perform operations on the received metadata to generate additional metadata information. For example, the processor 302 may integrate received acceleration information to determine a velocity profile of the imaging device 200 during a recording of a video.

The computing device 300 may include or be in communication with audio sources 308, such as one or more microphones, configured to provide audio information that may be associated with images acquired by the imaging device 200 or commands provided by the remote controller 214. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codecs). In one or more implementations of spherical video and audio, the audio codec may include a 3-dimensional audio codec.

The computing device 300 may include or be in communication with a user interface (UI) 310. The UI 310 may include a display configured to provide information related to operation modes (e.g., camera modes, flight modes), connection status (e.g., connected, wireless, wired), power modes (e.g., standby, sensor, video), metadata sources 306 (e.g., heart rate, GPS, barometric), and/or other information associated with the gimbal 100, the imaging device 200, the handheld grip 206, the UAV 210, and/or the remote controller 214. In some implementations, the UI 310 may include virtually any device capable of registering inputs from and communicating outputs to a user. These may include, without limitation, display, touch, gesture, proximity, light, sound receiving/emitting, wired/wireless, and/or other input/output devices. The UI 310 may include a display, one or more tactile elements (e.g., joysticks, switches, buttons, and/or virtual touch screen buttons), lights such as light emitting diodes (LED)s, speaker, and/or other interface elements.

The UI 310 may be configured to enable the user to provide commands to the gimbal 100, the imaging device 200, the handheld grip 206, the UAV 210, and/or the remote controller 214. For example, the user interface 216 shown in FIG. 2D is one example of the UI 310. User commands provided using the UI 310 may be encoded using a variety of approaches, including but not limited to duration of a button press (pulse width modulation), number of button presses (pulse code modulation), or a combination thereof. For example, two short button presses through the UI 310 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 300 may include an input/output (I/O) module 312. The I/O module 312 may be configured to synchronize the imaging device 200 with the remote controller 214, a second capture device, a smartphone, and/or a video server. The I/O module 312 may be configured to communicate information to and from various I/O components. The I/O module 312 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 312 may interface with LED lights, a display, a button, a microphone, speakers, and other I/O components. In one or more implementations, the I/O module 312 may be coupled to an energy source such as a battery or other DC electrical source.

The computing device 300 may include a communication module 314 coupled to the I/O module 312. The communication module 314 may include a component (e.g., a dongle) having an infrared sensor, a radio frequency transceiver and antenna, an ultrasonic transducer, and/or other communications interfaces used to send and receive wireless communication signals. In some implementations, the communication module 314 may include a local (e.g., Bluetooth, Wi-Fi) or broad range (e.g., cellular LTE) communications interface configured to enable communications between the gimbal 100, the imaging device 200, the handheld grip 206, the UAV 210, and/or the remote controller 214.

The communication module 314 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication module 314 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 314 may be represented using formats including one or more of hypertext markup language (HTML), extensible markup language (XML), and/or other formats. One or more exchanges of information between the imaging device 200 and outside devices, such as the remote controller 214, may be encrypted using encryption technologies including one or more of secure sockets layer (SSL), transport layer security (TLS), virtual private networks (VPNs), Internet Protocol security (IPsec), and/or other encryption technologies.

The computing device 300 may include a power system 316 that may moderate a power supply based on the needs of the gimbal 100, the imaging device 200, the handheld grip 206, the UAV 210, and/or the remote controller 214. For example, a battery, solar cell, inductive (contactless) power source, rectification, or other power supply housed within the handheld grip 206 and/or the UAV 210 may be controlled by the power system 316 to supply power for the gimbal 100 and/or the imaging device 200 when in a coupled state as shown in FIGS. 2B and 2C.

Stabilization mechanisms such as gimbal 100 have a physical limitation with respect to the range of motion in any one of three axes referred to as a mechanical or hard stop. Each motor 112, 114, 116 of gimbal 100 may be limited in its rotational range of motion about its respective axis. For example, each motor 112, 114, 116 may be limited to rotation between a minimum angle −X° and a maximum angle +X°. The limit of rotation may be based on a mechanical stopping mechanism that prevents the motor 112, 114, 116 from rotating beyond these limits irrespective of the control input. When rotation of the motor 112, 114, 116 is stopped by a hard stop, it may produce vibration in the imaging device, reducing the visual quality of video or images being captured by the imaging device. In some cases, the motor 112, 114, 116 may be damaged when rotation is stopped suddenly by a hard stop. Thus, the control system 118 operates according to a soft stop control technique that ensures that the motors 112, 114, 116 are gradually stopped as they approach their physical limits to avoid these undesired consequences. For example, in a soft stop region, a motor rate adjustment may be generated to slow the motor as it approaches the mechanical stop and in some cases, to cause the sensed motor angle to move back into a nominal region, where the nominal region represents a range of rotation angles in which the motor is nominally controlled.

During image capture, reaching a hard stop will create an undesirable erratic image capture due to the sudden stop of the imaging device caused by the physical impedance. Reaching a hard stop may also result in an obstructed field of view, for example the imaging device may capture a portion of the stabilization mechanism itself or an object that the stabilization mechanism is mounted on. In order to avoid this erratic or obstructed image capture, a soft stop may be implemented to create a virtual hard stop such that the soft stop indicates to the stabilization mechanism to reduce speed as a field of view of the imaging device approaches the soft stop and to stop at or near the soft stop, thereby restricting the field of view of the imaging device from reaching the hard stop. It may be possible for the field of view of the imaging device to overshoot the soft stop without resulting in an obstructed field of view. Typical soft stops do not take device settings or configuration aspects into account resulting in undesirable image capture.

Figure 4:
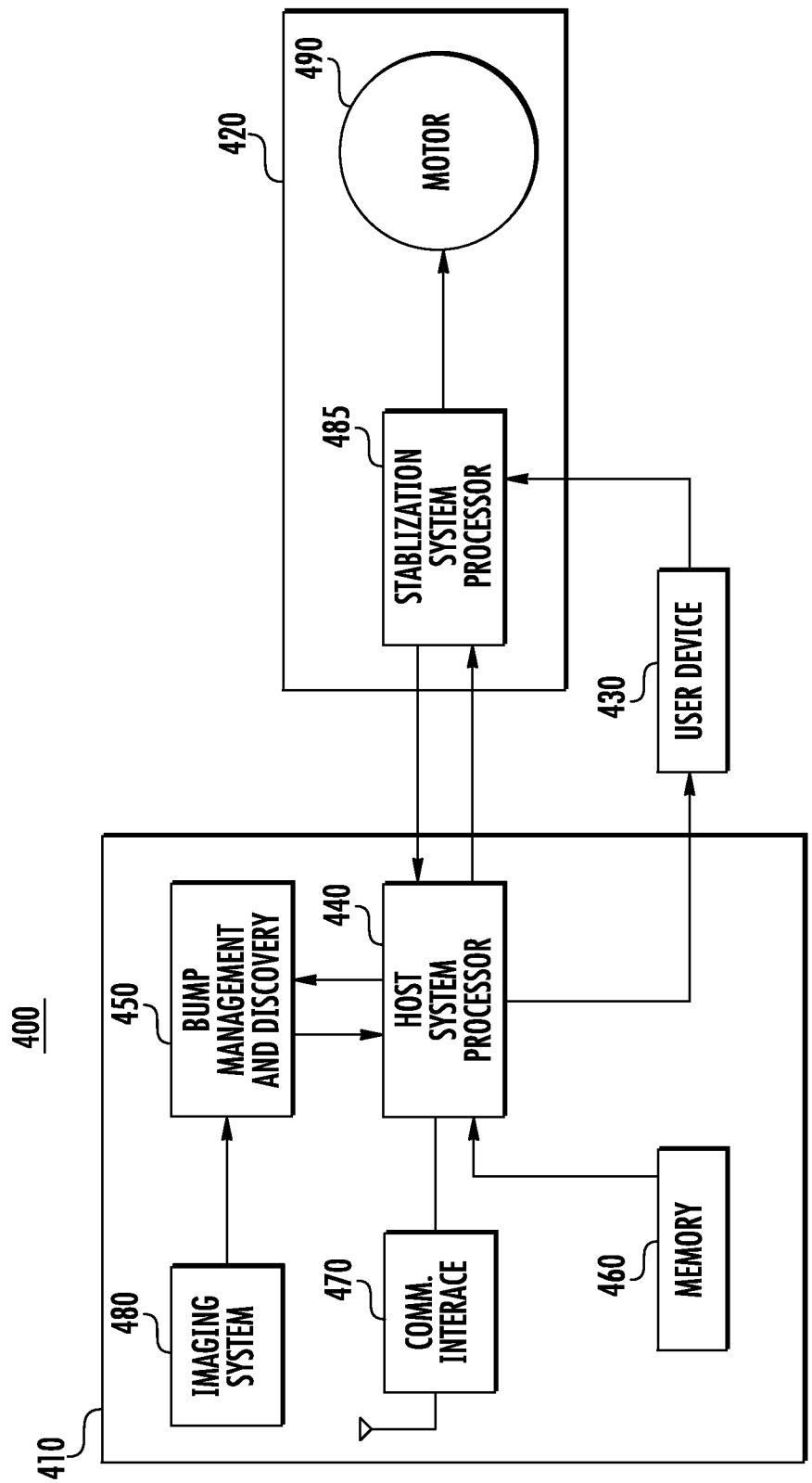
FIG. 4 is a diagram of an example of a system configured for optimal range of motion based on one or more device settings and configurations.

FIG. 4 is a diagram of an example of a system 400 configured for optimal range of motion based on one or more device settings and configurations. Device settings may include imaging device settings, parameters or modes. Configurations may include stabilizer configurations, parameters or modes. The system 400 includes a host 410, a stabilization mechanism 420 and a user device 430. The system 400 is configured to dynamically adjust the pitch, yaw, and roll of the stabilization mechanism 420 to avoid undesirable objects in an image capture, such as a propeller of a UAV or parts of the stabilization mechanism 420 itself, by generating soft stops such that the mechanical stabilization system does not physically reach the system hard stops. The system 400 is configured to dynamically adjust the pitch, yaw, and roll of the stabilization mechanism 420 based on device setting parameters, configuration parameters, user input, and/or imaging system data. Example device setting aspects may be any device setting of the host 410 including, and not limited to, resolution, portrait/landscape mode, and/or field of view. The configuration information may include a device type to which the stabilization mechanism is mounted, a type of situation that the stabilization mechanism is being used. For example, configuration information may include whether the stabilization mechanism 420 is mounted to a handheld grip, mounted to an aerial device, or mounted to a roadable device (i.e., a bicycle or surfboard). The configuration information may also include a specific type of aerial device, a specific type of mount, a specific type of handheld device (i.e., grip), and/or a specific activity. In an example where the stabilization mechanism 420 is mounted to a UAV, the configuration information may include that the stabilization mechanism 420 is mounted to a specific UAV and should operate in a manner suitable to aerial motion such that the pitch and roll axes are movable within a predetermined degree and the yaw axis is restricted. The specific activity may refer to a user activity such as mountain biking, hiking, swimming, and sky diving, etc.

The host 410 may be any image capture device. For example, the host 410 may be a camera, an integrated camera UAV, an integrated camera and stabilizer, or an integrated camera, stabilizer and UAV. The host 410 includes a host system processor 440 electronically coupled to a bump management and discovery processor 450, a memory 460, and a communication interface 470. In this example, the bump management and discovery processor 450 is electronically coupled to an imaging system 480 and may be configured to generate and store bump regions. The host system processor 440 may be configured to perform electronic image stabilization in conjunction with the imaging system 480.

The stabilization mechanism 420 may be mounted to a handheld grip or another object such as a UAV, bicycle, surfboard, etc. An example of the stabilization mechanism 420 may be gimbal 100. The stabilization mechanism 420 includes a stabilization system processor 485 and at least one motor 490. The stabilization system processor 485 is electronically coupled to the host system processor 440 and the motor 490, and is configured to receive a signal from the user device 430. The user device 430 may be the remote controller 214 shown in FIG. 2D. The user device 430 is electronically or wirelessly coupled to the host 410. The signal from the user device 430 may be sent to the stabilization system processor 485 via the communication interface 470 of the host 410. The user device 430 may be a remote controller 214, a personal device, such as a smartphone or tablet, a wearable device, such as a watch or personal article, or any other type of device that is configured to receive haptic feedback, digital message, audible message, LED indicator, or any other input/output (IO) feedback.

The stabilization system processor 485 may receive one or more of the device setting parameters from the host system processor 440 to generate a dynamic soft stop. The stabilization system processor may also receive imaging system data from the host system processor 440 to generate a dynamic soft stop. The stabilization system processor 485 may receive user input from the user device 430 to generate a dynamic soft stop. In addition, the stabilization processor may use a configuration parameter of the stabilization system 420 to generate a dynamic soft stop. Accordingly, a dynamic soft stop may be a soft stop based on one or more of a device setting parameter, imaging system data, user input, or a configuration parameter of the stabilization mechanism 420, and may be dynamically configured in real-time.

User input may be used to create a three-dimensional soft stop region in the X, Y, and Z axes. For example, for a soft stop that is 10 degrees away from the hard stop, an ellipsoid soft stop region may be generated around a home stabilizer position when the stabilization mechanism 420 is perfectly level.

The system 400 may be configured to generate a bump signal. A bump signal is a signal used to indicate feedback to a user. For example, in the case of a handheld mounted stabilizer, such as handheld grip 206 in FIG. 2B, the stabilization system processor 485 is configured to transmit a bump signal to motor 490 to create physical user feedback. For example, the bump signal could cause motor 490 to create a short jerk, a low frequency vibration that the user can feel in the handheld grip 206, a high frequency vibration that the user can hear, or any combination of the above. The physical feedback may be constrained to be within the limits of the electronic image stabilization system of the image capture device such that the vibrations are not detected in the image capture. In the case of an aerial mounted stabilization system, such as gimbal 100 on UAV 210 in FIG. 2C, the stabilization system processor 485 is configured to transmit a bump signal to the host system processor 440. The bump signal may be transmitted prior to crossing a soft stop or it may be transmitted upon crossing a soft stop. The host system 440 in response transmits a digital signal to the user device 430 to create haptic feedback, digital message, audible message, LED indicator, or any other IO feedback.

User input may be used to create a custom three-dimensional region of interest to trigger a bump signal. This three-dimensional region of interest may be referred to as a bump region. The bump region may be correlated with the soft stop or it may be independent from the soft stop. For example, for a soft stop that is 10 degrees away from the hard stop, an ellipsoid bump region may be generated around the home stabilizer position when the stabilization mechanism 420 is perfectly level. A bump rule may be created such that an alert is sent to a user when a criterion is met. A bump rule may be created based on a device setting and/or configuration information. For example, a bump rule may be created such that when the device is pitched up greater than 5 degrees, a bump signal is generated to send feedback to the user. System bump rules and user defined bump rules may be stored in the memory 460.

The imaging system 480 is configured to feedback image data to the host system processor 440 via the bump management and discovery processor 450 such that the user can view data in the UI and manually set soft stops and bump regions. Image data is sent from the imaging system 480 to the host system processor 440 such that an algorithm detects when the host 410 is seeing itself or the device that it is mounted to and automatically determines and generates a soft stop region. For example, the user may mount the host 410 to an aerial device and the imaging system 480 may detect where the propellers are located in a field of view of the host 410 and define this as a keep out area. The keep out area is a three-dimensional spatial area where the field of view of the host 410 is restricted from entering.

Figure 5B:
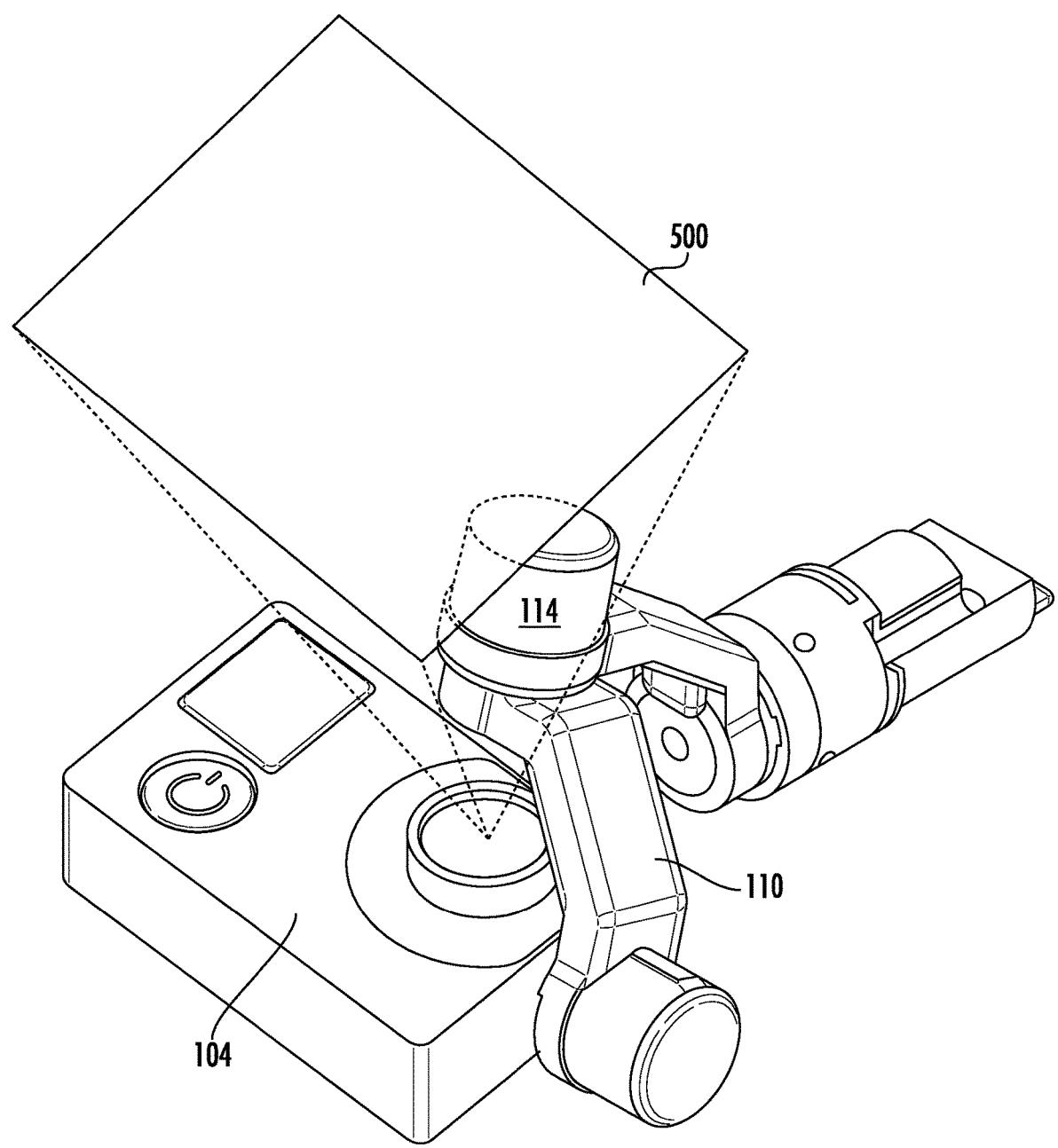
FIG. 5B is a diagram of an example of a partially obstructed field of view for an imaging device.

FIGS. 5A and 5B show an example of a field of view 500 for an imaging device 104 using the three-axis image stabilization mechanism of FIG. 1A. As shown in FIG. 5A, a field of view 500 is unobstructed from any of the elements of the gimbal 100 that holds the imaging device 104. In FIG. 5A, an example of a hard stop would be where the field of view 500 encounters the arm 110 when the imaging device 104 is pitched upwards. An example of the field of view 500 being partially obstructed by the arm 110 and the second motor 114 is shown in FIG. 5B.

Figure 6:
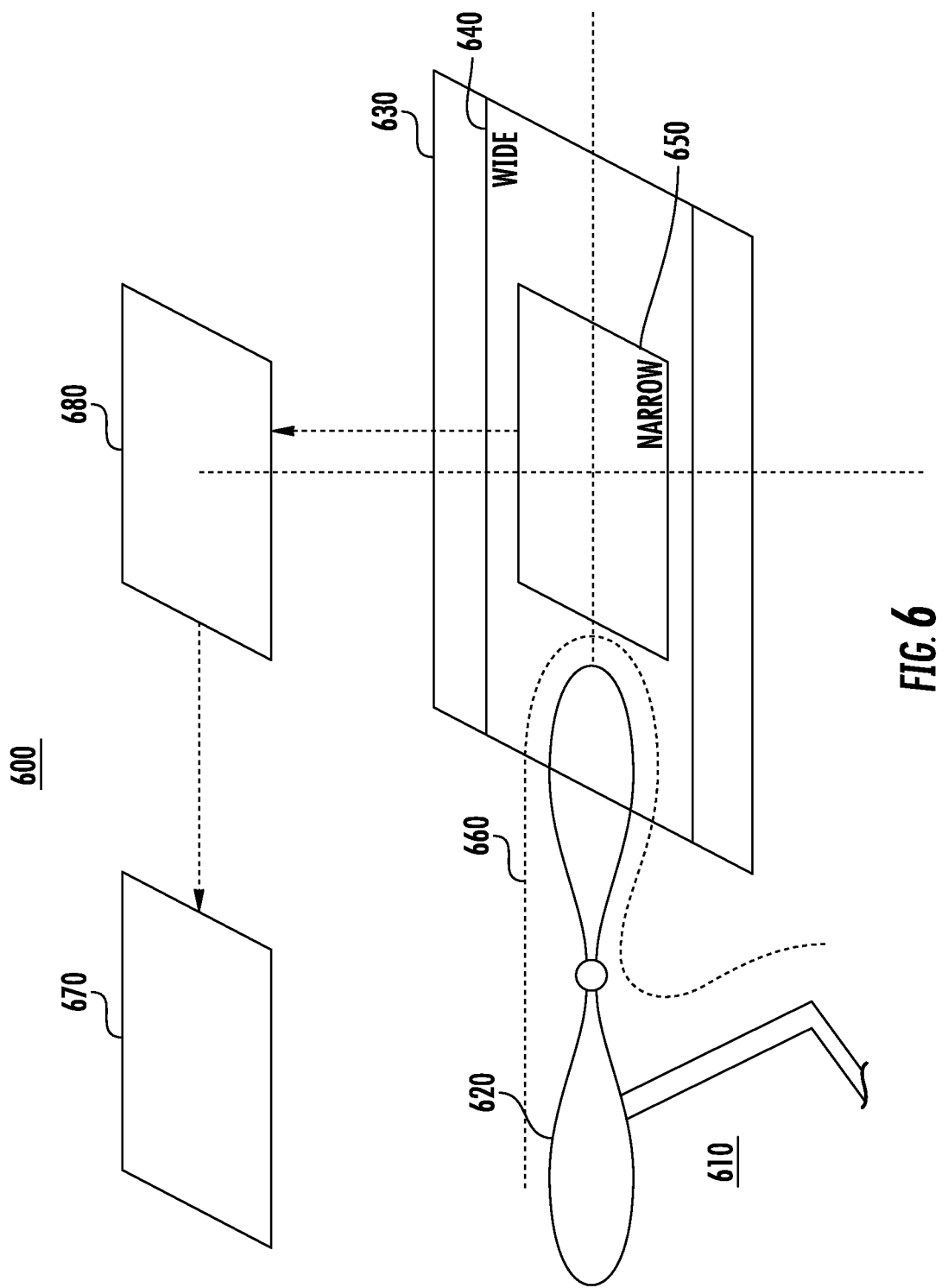
FIG. 6 is a diagram of an example of a scenario where a dynamic soft stop is used to define a keep out area that allows a maximum range of motion for a stabilizer and an image capture without obstructions.

FIG. 6 is a diagram of an example of a scenario 600 where a dynamic soft stop is used to define a keep out area that allows a maximum range of motion for a stabilizer and an image capture without obstructions. Depending on the how a stabilization mechanism is mounted, there may be fixed obstructions in a field of view that would result in an undesirable image capture. In this example, an imaging device (not shown) such as the imaging device 104 shown in FIG. 1A is mounted to a stabilization mechanism (not shown) and a UAV 610 (a portion of which is shown) that has at least one propeller 620. The propeller 620 in this example is a fixed obstruction. The imaging device is configured to perform an image capture in a variety modes to capture multiple fields of view. For example, the imaging device may include a normal mode to capture a normal field of view 630, a wide mode to capture a wide field of view 640, and a narrow mode to capture a narrow field of view 650. In this example, when the stabilizer is in its current position, the narrow field of view 650 is without obstruction, while the normal field of view 630 and the wide field of view 640 are partially obstructed by the propeller 620.

Referring to FIG. 6, the stabilizer creates a dynamic soft stop region 660 based on an imaging device setting, a stabilizer configuration, user input, or any combination thereof to define a keep out area that allows a maximum range of motion for the stabilizer and an image capture without obstruction by the propeller 620 and/or UAV 610. In this scenario 600, the user would like to capture area 670 without obstruction from the propeller 620 and/or UAV 610. If the user commands the stabilizer to move the field of view of the imaging device directly from its current position to area 670, an undesirable image capture would result as the propeller 620 would cause a partial obstruction during at least a portion of the move. In this example, using the narrow field of view 650 and the dynamic soft stop region 660, the stabilizer can pitch up on the Y-axis to area 680 and then yaw left on the Z-axis to area 670 to capture area 670 without obstruction from the propeller 620. The stabilizer may also implement a bump that is correlated with the dynamic soft stop region 660 to send feedback to the user that the field of view is approaching the dynamic soft stop region 660.

FIG. 7A is an example of a plot 700 of the dynamic soft stop region 660 of FIG. 6 in two dimensions. As shown in FIG. 7A, a keep out area 710 is created by the dynamic soft stop region 660 and represents the area occupied by the UAV 610 and propeller 620. A bump may be implemented that is correlated with the dynamic soft stop region 660 to send feedback to the user that the field of view is approaching the dynamic soft stop region 660.

FIG. 7B is an example of a plot 750 of the dynamic soft stop region 660 in three dimensions. As shown in FIG. 7B, a keep out area 760 is created by the dynamic soft stop region 660 and represents the area occupied by the UAV 610 and propeller 620. A bump may be implemented that is correlated with the dynamic soft stop region 660 to send feedback to the user that the field of view is approaching the dynamic soft stop region 660.

FIG. 8 is an example of a scenario 800 where a dynamic soft stop 810 is used to define a keep out area 820 that allows a maximum range of motion for a stabilizer. The keep out area 820 is an area between the dynamic soft stop 810 and a hard stop 830. As a field of view of an imaging device, such as imaging device 104 shown in FIG. 1A, approaches the soft stop 810, a bump signal may be generated to alert the user that the hard stop 830 is approaching. The soft stop 810 may be configured automatically based on a device setting and/or stabilizer configuration as described above. Alternatively, or in addition to, image data may be fed back to the system such that the user can see data in the UI and manually set soft stops and bump regions. The UI may be, for example, UI 310 shown in FIG. 3. In one example, the user may draw on a screen of the UI to manually set the soft stops and bump regions. The image data may be fed back into the system such that an algorithm can detect when the image capture device is seeing itself or the device that is mounted to and automatically detect the soft stop region. For example, the user may mount the imaging device and the stabilizer to an aerial device and detect where the propellers are and define this as a keep out region.

The embodiments described herein may be applied to optimizing stabilization mechanisms to further improve image capture. For example, the optimizations may refer to changes made to motor operations to reduce vibrations from the motor of the stabilization mechanism. A communication bus frequency is maximized to optimize the stabilization mechanism control performance. The jitter and latency of the communication bus are minimized to optimize the stabilization mechanism control performance. This is accomplished by using small packets, high priority tasks, and real-time deterministic code, and by precluding bus sharing. A smoothing filter may also be used to reduce the vibrations.

Figure 9:
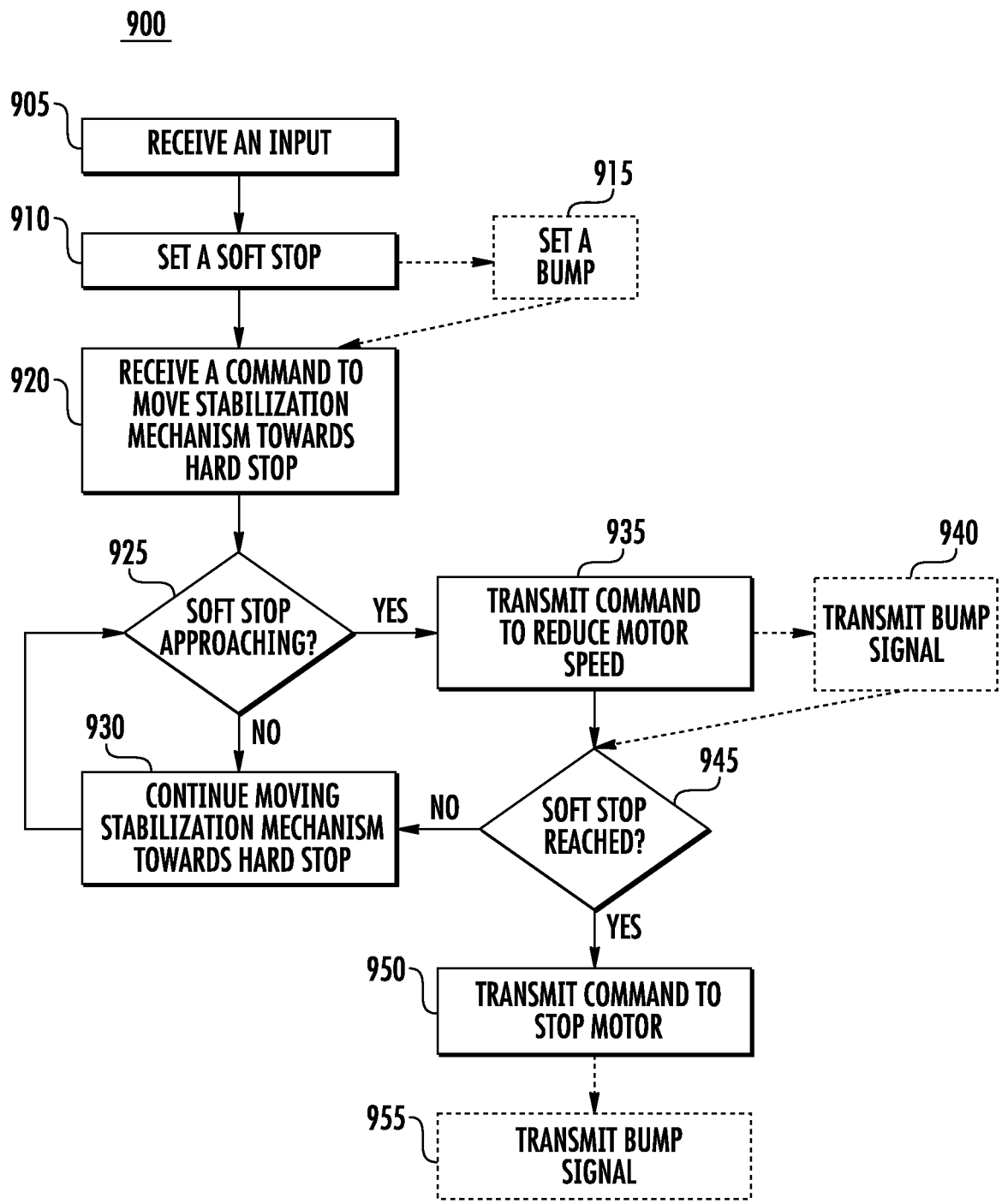
FIG. 9 is a flowchart of an example of a dynamic soft stop process.

FIG. 9 is a flowchart describing an example of a dynamic soft stop process 900. Referring to FIG. 9, a control system such as the control system 118 of FIG. 1 receives an input at operation 905. The input received may be a device setting, configuration, imaging data, and/or user input as described above. The control system then sets a soft stop 910 based on the received input. In some examples, the control system may set a bump region 915 based on the received input.

At operation 920, the control system receives a command to move the stabilization mechanism towards a hard stop. The control system transmits a signal to the appropriate motor(s) to move the stabilization mechanism towards the hard stop. As the stabilization mechanism moves towards the hard stop, the control system determines whether the soft stop is approaching at operation 925. If it is determined that the soft stop is not approaching, the stabilization mechanism will continue to move towards the hard stop at operation 930. If it is determined that the soft stop is approaching, the control system transmits a command to the motor(s) to reduce motor speed at operation 935. In some examples, the control system transmits a bump signal at operation 940 to alert the user that the soft stop is approaching. The bump signal may be used to trigger an alert such as haptic feedback, a digital message, an audible message, an LED indicator, or any other 10 feedback.

At operation 945, the control system determines whether the soft stop has been reached. If the soft stop has not been reached, the control system will continue to move the stabilization system towards the hard stop at operation 930. If the control system determines that the soft stop has been reached, the control system transmits a command to the motor(s) to stop the motor(s) at operation 950. In some examples, the control system transmits a bump signal at operation 955 to alert the user that the soft stop has been reached.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "algorithm," "computer program," or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" or "drone" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An apparatus comprising:
   a motor; and
   a control system configured to:
   receive data associated with an image;
   determine an obstruction in a field of view based on the data;
   determine a first stop based on the data that defines a keep out area between the first stop and a second stop associated with the obstruction; and
   transmit a command to the motor to reduce motor speed based on a determination that a stabilization apparatus is approaching the keep out area.

2. The apparatus of claim 1, wherein the control system is configured to:
   set an alert region to alert a user, wherein the alert region is associated with the first stop.

3. The apparatus of claim 2, wherein the control system is configured to:
   transmit an alert signal to alert the user that the first stop is approaching.

4. The apparatus of claim 2, wherein the control system is configured to:
   responsive to the alert region being reached, transmit the command to the motor to reduce the motor speed.

5. The apparatus of claim 1, wherein the control system is configured to:
   determine whether the first stop is reached.

6. The apparatus of claim 5, wherein the control system is configured to:
   responsive to the first stop being reached, transmit the command to the motor to stop the motor.

7. The apparatus of claim 1, wherein the first stop is a soft stop and the second stop is a hard stop.

8. The apparatus of claim 1, wherein the control system is configured to:
   receive a user input, wherein the user input includes at least one of a user drawing, a user voice command, or a user text input.

9. A method for use in a stabilization apparatus, comprising:
   determining a soft stop based on an imaging device setting and a stabilization apparatus configuration, wherein the soft stop is a non-mechanical stop; and
   setting an image stabilization apparatus parameter based on the determined soft stop during an image capture process of the imaging device.

10. The method of claim 9, wherein the soft stop indicates to the stabilization apparatus to reduce motor speed as a field of view of the imaging device approaches the soft stop.

11. The method of claim 10, wherein the imaging device setting includes at least one of an image resolution, an image mode, or the field of view of the imaging device.

12. The method of claim 9, wherein the stabilization apparatus configuration includes at least one of whether the stabilization apparatus is a handheld or mounted stabilization apparatus, whether the stabilization apparatus is an aerial configuration, whether a specific aerial device is used, whether a specific mount is used, whether a specific handheld device is used, or whether a specific activity is performed.

13. The method of claim 9, comprising:
   transmitting an alert signal to alert a user that the soft stop is approaching.

14. The method of claim 13, wherein the alert signal is at least one of an audible alert, a luminous alert, a text alert, or a haptic alert.

15. The method of claim 9, comprising:
transmitting an alert signal to alert a user that the soft stop is reached.

16. A system comprising:
a memory; and
a processor, wherein the processor executes instructions stored in the memory to:
determine an obstruction in a field of view based on image data;
determine a first stop based on the image data that defines a keep out area between the first stop and a second stop associated with the obstruction; and
responsive to a determination that the keep out area is being approached, transmit a command to the motor to change motor speed.

17. The system of claim 16, wherein the processor executes the instructions stored in the memory to:
receive an input that is at least one of the image data, an imaging device setting, an imaging device configuration, or a user input.

18. The system of claim 17, wherein the imaging device setting includes at least one of an image resolution, an image mode, or the field of view.

19. The system of claim 18, wherein the image mode is at least one of a portrait mode or a landscape mode.

20. The system of claim 17, wherein the imaging device configuration includes at least one of whether the system is a handheld or mounted stabilization apparatus, whether the system is an aerial configuration, whether a specific aerial device is used, whether a specific mount is used, whether a specific handheld device is used, or whether a specific activity is performed.

* * * * *